Jan. 7, 1941.  M. W. HOWARD ET AL  2,228,055
BLOCK SAWING MACHINE
Filed Sept. 7, 1937  4 Sheets-Sheet 3

Inventors
Merton W. Howard
George T. Watt
By Wright, Brown
Quinby May
Attorneys

Jan. 7, 1941.  M. W. HOWARD ET AL  2,228,055
BLOCK SAWING MACHINE
Filed Sept. 7, 1937   4 Sheets-Sheet 4

Inventors
Merton W. Howard
George T. Watt
By Wright, Brown,
Quinby & May
Attorneys Patented Jan. 7, 1941

2,228,055

UNITED STATES PATENT OFFICE 2,228,055

BLOCK SAWING MACHINE

Merton W. Howard and George T. Watt, Haverhill, Mass., assignors to Pope Machinery Corporation, Haverhill, Mass., a corporation of Massachusetts Application September 7, 1937, Serial No. 162,624

5 Claims. (Cl. 143—36)

This invention relates to heel-making and is shown as embodied in a machine for sawing strips of lumber into individual blanks for wood heels.

In the manufacture of wood heels, the maple or other hard wood is rip-sawed and surface-planed on regular commercial rip saws and planers into strips about four feet long and with one of the other dimensions equal to the height and the other equal to the width of the desired heel blank. Ordinarily only two opposite sides of these strips are planed, these planed sides providing smooth parallel finished surfaces for the seat and toplift surfaces of the heel blanks. The remaining two side surfaces are usually rough-sawed surfaces which may be, and often are, not exactly parallel to each other, nor exactly at right angles to the plane surfaces.

The next operation, which is the one to which this invention relates, consists of cross-cutting these strips into individual heel blanks by oblique angled cuts through the planed surfaces of the strip, these cross cuts forming the angular back and front surfaces of the heel blank. This cross-cutting is commonly called "block sawing".

Up to the present time, this block sawing operation has been done on a simple hand-operated machine consisting in its essentials of a conventional circular saw and a limited range sliding horizontal table. The table carries a pivoted bar or back stop which can be oscillated over a range limited both ways by adjustable stops. This table assembly is reciprocable past, and close to, the free face of the saw. Near the opposite face of the saw a pair of independently adjustable strip stops are provided. In operation the workman sets the stops for the oscillating table bar so that, when a strip of lumber is held in contact with the bar and the bar is held against one of its stops, the resulting angular cut when he pushes the table and strip past the saw will be correct for the back surface of a heel blank, and, when the bar and strip are swung against the other bar stop, the cut will be correct for the front surface of the blank. One of these cuts forms the back surface of two blanks and the other the front surface of two blanks so that it requires one reciprocation of the table past the saw to produce one blank. The length of the blanks is determined by the two strip stops, these being disposed so as to be alternately engaged by the strip as the strip and bar are alternated between the bar's two limiting stops. It is necessary to have two strip stops because of the angular change in direction of strip movement against the stops and also because the heel blank front and rear surfaces are alternately engaged by the stops.

It will be seen that the workman, to produce one heel blank, must (first) swing the strip and bar over the table to a stop, (second) slide the strip endwise the length of a single blank along the bar and against the strip stop, (third) push the table and the strip past the saw to make the cut, and (fourth) pull the table, strip and bar back to the starting point. These constitute four distinct movements of which the first, third and fourth require considerable effort and time.

In an attempt to increase production on these hand machines the workman, in cutting off each blank, naturally makes these four moves as rapidly as possible. And as the movements are speeded up the energy necessary to produce them is thereby greatly increased. It takes considerable man power, for example, to swing a four-foot strip of heavy rock maple and the table bar rapidly through an oscillation of from 20° to 40°, the average being, in practice, about 30°. As the strip shortens, this oscillating effort is thereby eased somewhat, but the rapid pushing and pulling of the table and bar and the swinging of the bar is a constant physical load on the workman. In his attempt to increase production, the workman frequently undershoots the strip stops, thereby producing blanks that are too short, and more frequently he fails to hold the swinging bar against its respective stops so that faulty front and back angles are produced on the blanks, thus causing material losses. In addition to seeing to it that the strip is against the strip stop and that the bar is against its stop, the workman must, prior to and throughout the cut, hold a planed surface of the strip tightly against a finished front surface on the bar so that skew angles in cutting will be avoided. Both gravity and the cutting thrust of the saw tend to move said planed strip surface away from said finished bar surface if the rough sawed surfaces of the strip are not at right angles to the planed surfaces, which is the rule rather than the exception. As a result of all of this effort and attention necessary to produce one blank, the workman is strongly inclined to make the cut itself at a speed faster than the saw can properly accommodate, with the result that the fibers of the blank are strained and loosened some distance into the wood adjacent the sawed surface. Such loosening of the wood fibers at tender points, such as the back edge of the heel seat, is likely to cause destruction of a finished or nearly finished heel, because the wood at its best is only barely strong enough to form the thin cross-grained section necessary at the rear rim of the finished heel.

It is an object of this invention to provide a machine which will require the workman to perform only one, namely the second, of the before-mentioned movements, the remaining three more difficult movements and the proper positioning of the strip during the cutting being either eliminated or automatically performed by the machine.

A further and most important object is to cut two blanks simultaneously, instead of a blank at a time as done heretofore, and to make these cuts at a predetermined and proper speed.

These and other objects of the invention are achieved by the use of two cutters such as saws adjustable to cut a strip simultaneously at different predetermined angles, thus obviating the need of swinging the strip back and forth between successive cuts as done in previous practice. According to the present invention, mechanism is provided for gripping a strip and automatically moving two saws to cut the gripped strip. The gripping means is then released so that the strip can be pushed along a stationary guide to engage a stop so as to be in correct position for the next cutting operation. Various portions of the apparatus, including the saws, are adjustable for the sawing of blocks of different dimensions as may be required for heels of different sizes and styles. Related adjustable parts are mechanically connected so as to reduce to a minimum the number of adjustments which must be made to adapt the apparatus for the production of blocks of different dimensions.

The invention will be more clearly understood from the following description in conjunction with the accompanying drawings in which Figure 1 is a plan view of a machine embodying the invention, strip-feeding means being omitted to avoid confusion of detail.

Figure 1:
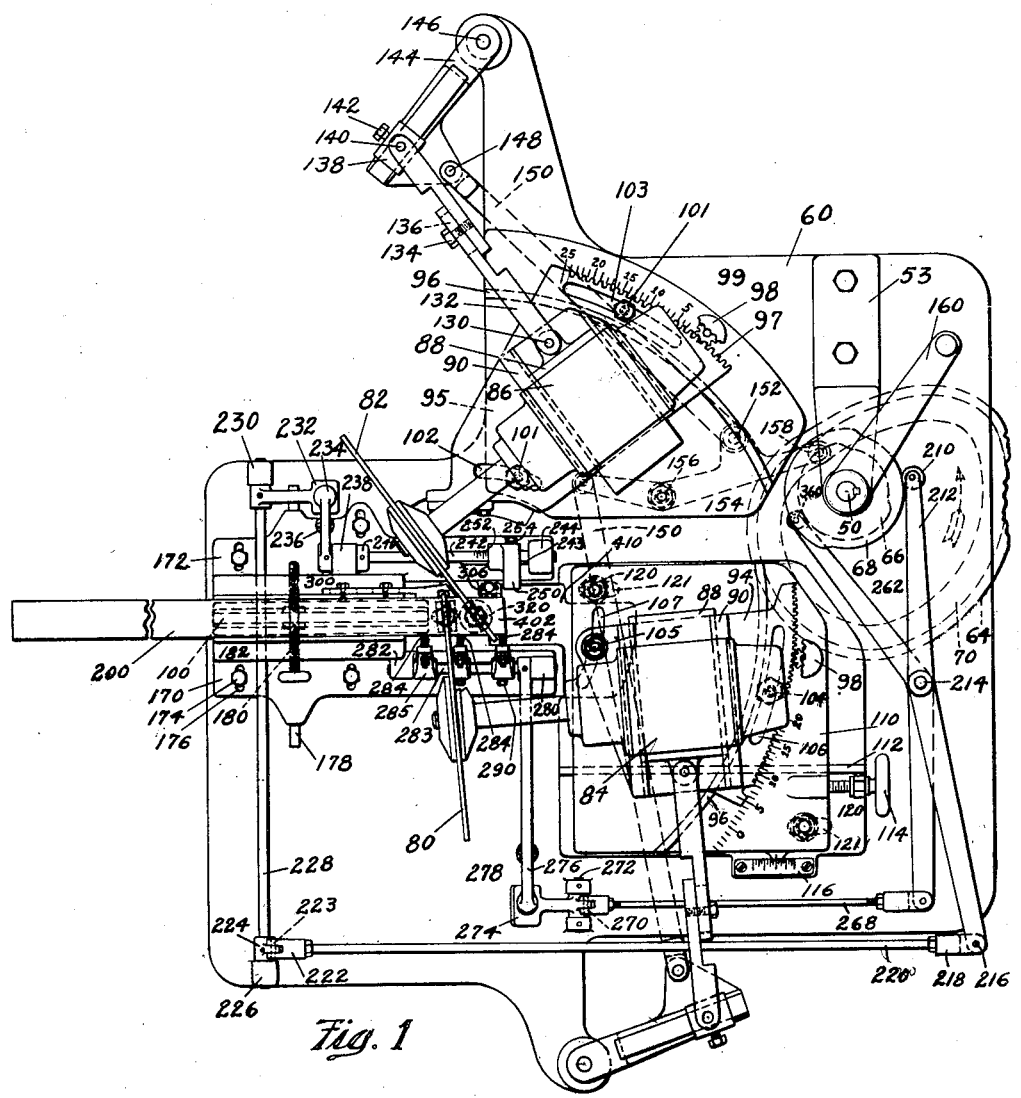

A frame 10 has on it a bracket 12 carrying a motor 14 belted to a pulley 16 free to rotate between collars 17 on a shaft 18 of speed reducer 20 bolted to shelf 22 extending across frame 10. A compression spring 24, acting between a collar 26 and a disc 28 slidably mounted on the shaft 18 by a key 30, normally establishes a friction driving connection between the motor 14 and the speed reducer 20. A foot pedal 32, operating through a push rod 34 and a bell crank 36 pivoted on the shelf 22 by a pivot 38, acts, when pressed down, to overcome the spring 24 and move the disk 28 out of contact with the pulley 16 and thus break the driving connection. A slow speed shaft 44 has pinned to it a ratchet collar 46 carrying a ratchet dog 48 pressed by a spring 52 into engagement with teeth 54 on a shaft 50 in which the shaft 24 has a pocket bearing. The upper end of the shaft 50 is journaled in a bracket 53 bolted to a table 60 which is bolted to the frame 10 by bolts 62. The shaft 50 carries three cams, an enclosed cam 64 below the table 60 with its cam path 70 facing downward, and cams 66 and 68 above the table. As hereinafter described, these cams are employed to advance and retract a pair of circular saws so as to cut blocks from a strip of wood, to interpose a stop in the path of said strip and to remove said stop, and to operate clamping devices to grip the strip while it is being sawed.

Figure 5:
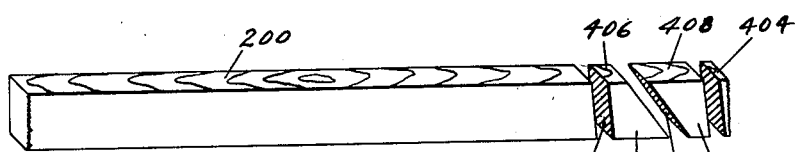
Figure 5 is an isometric view of a strip and blocks cut therefrom.

Figure 5 shows a typical strip 200 of wood for heel blanks. The machine hereinafter described is adapted to saw off the rough end 404 of the strip, then to saw off simultaneously a pair of blanks 400 and 402, whereupon the strip is advanced into position for another pair of blanks to be sawed off. The distance of such advance is approximately equal to the sum of the lengths of the top face 406 and the front seat 408 of a blank. The simultaneous cuts are made from opposite sides of the strip at different angles corresponding respectively to the angles of inclination of the breast face 408 and the rear face 410 of a blank.

A pair of circular saws 80 and 82 or equivalent cutting tools are mounted in a conventional manner on the shafts of respective motors 84 and 86. These two motors and their controlling mechanisms being identical to a large extent, description will be confined, in part, to one of these motors. Each motor has a male sliding support or base 88 reciprocable in ways 90 which are parallel to the plane of the respective saw blades so that the saws may be advanced in their own planes for cutting operations. The ways 90 are formed or mounted on respective plates 94 and 95 which are guided by arcuate splines 96 for angular adjustments about vertical axes positioned centrally of the thickness of the respective saw blades and centrally of a bottom support 100 for the wood strips to be cut. A rack 97 and a hand wheel pinion 98 for each said plate form convenient means for making angular adjustments which are indicated by degree graduations 99. The plate 95 is secured in adjusted position by a pair of bolts 101 which pass through arcuate slots 102 and 103 in the plate which are concentric with the spline 96, and suitable holes in the table 60. The plate 94 is secured to a second base plate 110 by bolts 104 and 105 which pass through slots 106 and 107, respectively, in the plate 94 which are arcuate and are concentric with the corresponding spline 96. For the motor 84 and its saw 80, translational adjustment is desirable in addition to angular adjustment. To this end, the base plate 110 which carries the plate 94 and its motor 84 is adjustable in a straight line under guidance of a spline 112 by rotation of a hand wheel 114, and is locked to the table 60 by bolts 120 passing through slots 121 in the table. A scale 116 provides for records of settings. This adjustment is parallel to the lengthwise axis of strip bottom support 100.

For the movement of saws through their cutting strokes, each motor base slide 88 is connected at 130 to a link 132, the other end of which is connected at 140 to a block adjustably carried by a lever arm 144 which is pivoted at 146. The block is secured in adjusted position on the arm 144 by a set screw 142. The links 132 are alined as nearly as possible with the direction of movement of the motor slides on their ways 90 when blanks for an average heel are being sawed. The pivotal connection 130 between the links and the slides permit the necessary angular adjustments of the saws without any cramping in the working slides. Each link 132 is made in two parts for variation of the length of the link to change the limits of the cutting stroke. These parts are held in adjusted position by a bolt 134 extending through a slot 136 in one of the parts and screw-threaded into the other part. The effective length of each lever arm 144, and hence the length of the cutting stroke, may be varied by shifting the block 138 toward or from the pivot 146. Each lever arm 144 is rocked by a link 150 pivotally attached thereto at 148. The two links 150 are attached to a rocking lever 154 which rocks about a pivot 156 and is actuated by a cam follower 158 mounted thereon and riding in the cam path 70. A hand lever 160 is mounted on the shaft 50 to permit quick setting of the cam 64, and also the other associated cams, to any desired position, such motions being made possible by the ratchet device on the shaft 50 shown in Figure 2.

Figure 2:
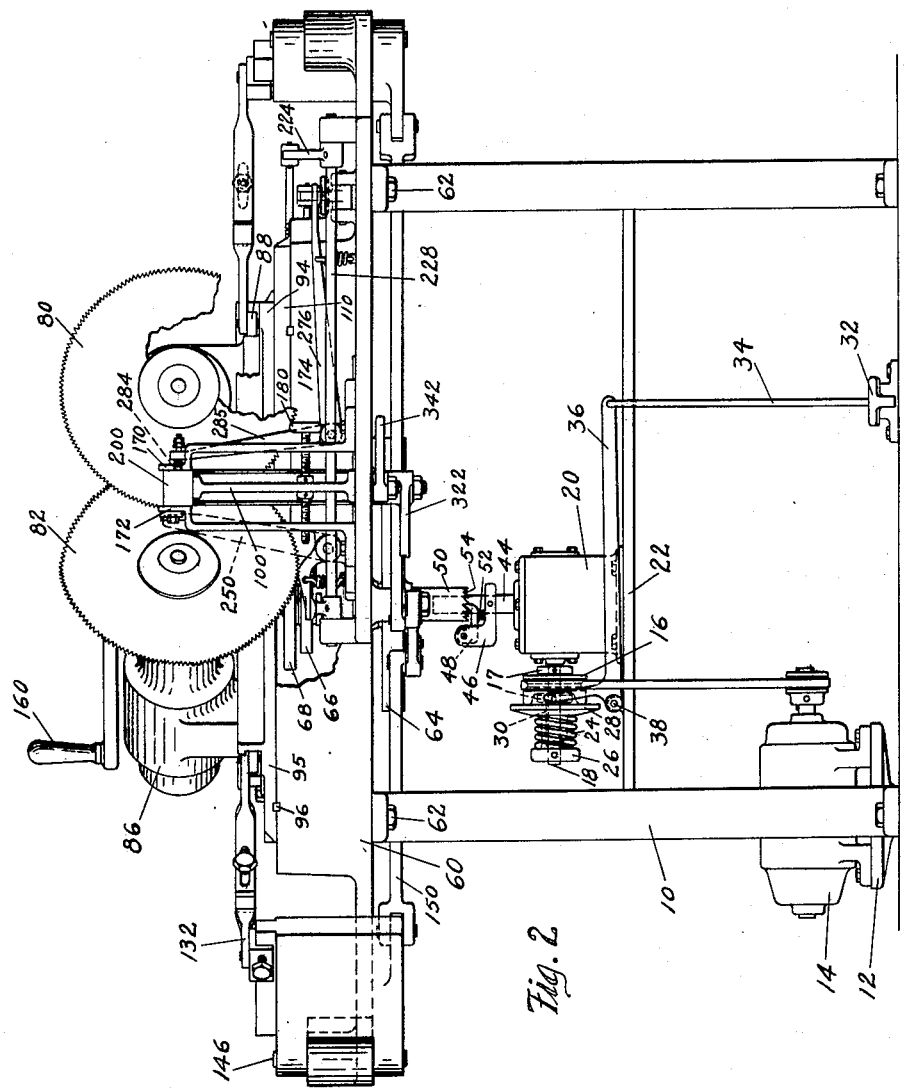
Figure 2 is a side elevation of the same.

Strips of wood to be sawed are carried upon the horizontal support 100 which, as indicated in Figure 2, may be in the form of an I-beam mounted on the table 60. Adjustable guide members 170 and 172 are provided with opposed vertical finished faces which, with the top of the support 100, form a channel or trough in which the strips of wood fit with sufficient looseness to be freely slidable longitudinally therein, that is, in the direction of their long axes. The axis of a strip located within the guide channel intersects the planes of both of the saws 80 and 82, so that, when the saws are advanced for a cutting operation, the strip lies in the paths of their advance. The guide members 170 and 172 are secured to the table 60 in fixed position by bolts 174 which pass through slots in the guide bases and can be loosened to permit adjustment of the guides along the spline 178 to accommodate strips of different widths. In order to keep the support 100 centered between the guides 170 and 172, the latter are caused to have equal and opposite adjustive movements by a right- and left-handed screw 180 which is in threaded engagement with the respective guide members and is held against axial movement by a pair of collars 182 thereon which abut opposite faces of the support member 100.

After each operation of the saws, the strip must be moved forward to be in position for the next cutting operation. Its correct position is determined by a stop gage which is movable periodically out of operative position to permit the discharge of the blocks severed from the strip. Movements of the stop gage are controlled by the cam 68 which engages a roller 210 in the end of a lever 212 rockable on a pin 214 in the table 60. A pin 216 connects a rod 220 by way of an end fitting 218 to the lever 212 and is pivotally connected to a lever 224 by a fitting 222 and a pivot pin 223 at its opposite end. The lever 224 is fast on a shaft 228 journaled in bosses 226 and 230 raised from the table 60. Also made fast on the shaft 228 is a lever 232 having an enlarged end rectangular in shape and having a paddle-shaped flat upper surface engageable by a ball-shaped end of a lever 234 fastened to a shaft 242 journaled in bosses 238 and 244 on the base of the guide member 172. A collar 240 acts to hold the shaft 242 against axial movement. A stop member 250 for wood strips is adjustable along the shaft 242 on a key 243 and is lockable thereon by a bolt 254. Graduations 252 permit records of settings to be made. A tension spring 236 acts to retract the strip stop 250 from the path of the strip 200 and to keep all slack motion out of the entire operating mechanism back to and including the follower 210 and its cam 68.

By somewhat similar mechanism as that just described, a gripping or clamping device is operated to clamp the strip 200 tightly during each cutting operation and to release the strip thereafter. This is controlled by the cam 66 which acts on a cam follower 260 in the end of a lever 262 which is pivoted on the pin 214. The opposite end of the lever 262 is connected by a link or rod 268 to an arm 270 of a bell-crank which is pivoted at 272. The other arm of the bell-crank has a flat surface 274 on which rides a rounded element at the end of an arm 276, the object of the ball-and-paddle joint being to permit longitudinal adjustive movement of the arm 276 without affecting the operation of the joint. The arm 276 is fixed on a rock shaft 283 journaled in bosses 280 and 282 (Figure 1) on the base of the guide member 170. Also secured to the shaft 283 are a number of upstanding arms 285, each carrying at its upper end a spring-cushioned finger 284. Three such arms and fingers are illustrated on the drawings, but any other desired number may be employed. These arms and fingers are adjustable along the shaft 283 but are splined or keyed to rock therewith so as to move the fingers against a side of the work 200, pressing the work tightly against the vertical guiding surface of the member 172 and thereby clamping the work tightly in position during cutting operations. For this reason, the guiding surface of the member 172 should be accurately finished so as to be in a vertical plane when the machine as a whole is set, as it should be, with the axes of the saws 80 and 82 in a horizontal plane. In order to avoid interference between the saw blades and the guide member 172, the latter is preferably made with adjustable elements 300 and 306 which are movable relatively to the main portion of the member 172 but which, when tightly bolted thereto, have vertical plane faces alined with the guide face of the main portion thereof.

Figure 3:
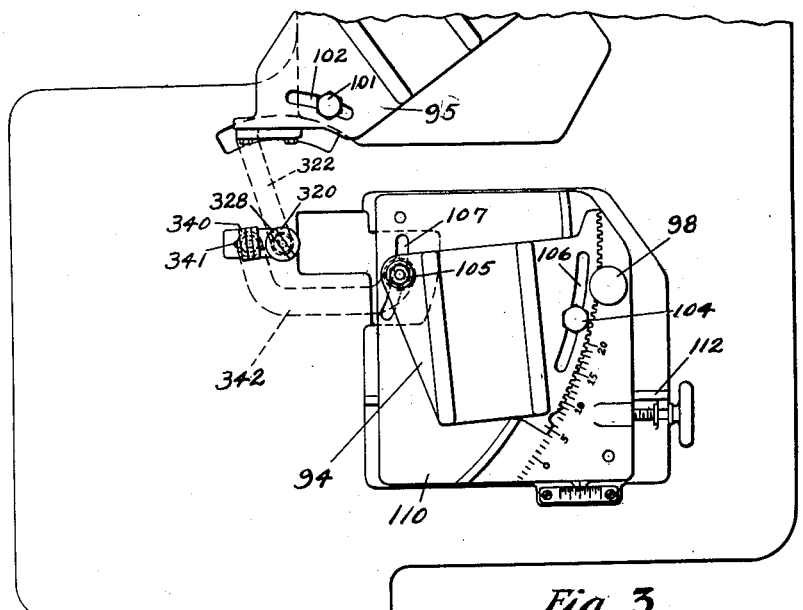
Figure 3 is a partial plan view showing cutting thrust supports and operating means.
Figure 4:
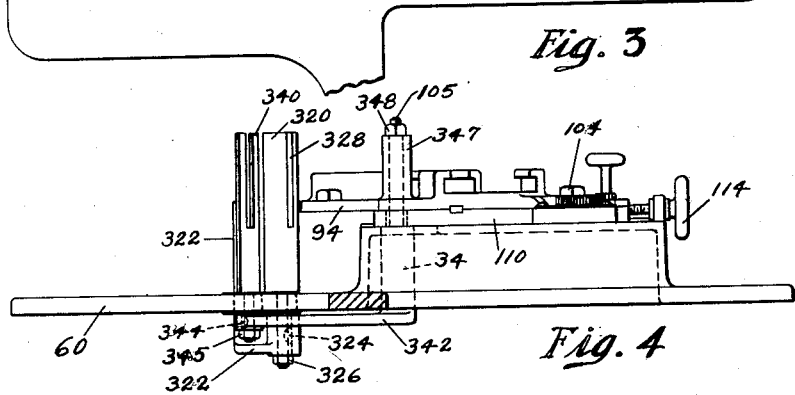
Figure 4 is a partial side elevation of the same.

Owing to the adjustability of the saws 80 and 82, thrust support members for the work are provided with their upper surfaces in the same plane with the upper surface of the support member 100 so as to act as virtual extensions of that member, but are otherwise independent thereof. As indicated particularly in Figures 3 and 4, these thrust support members may comprise upstanding columns 320 and 340, the upper ends of which are slotted to receive the saw blades 82 and 80, respectively. Since the slots are preferably made as narrow as possible so as to provide maximum support for the work, it is evident that, whenever either saw is adjustably moved, the corresponding thrust support member must be also adjusted accordingly. According to the invention, the thrust support members are mechanically connected to the supporting plates of the saws so that they automatically adjust themselves whenever the saws are adjusted. Since the supporting plate for the saw 82 is capable of angular adjustment only, the member 320 is located on the same axis, that is, concentric with the spline 96 and the slots 102 and 103, so that rotative adjustment about its own axis is all that is required. To this end, the member 320 is keyed to a bracket 322 which projects from the plate 95. A key 324 keeps the member 320 in constant angular relation to the saw 82, but permits axial freedom so that the member 320 can be secured tightly to the table 60 by setting a nut 326 at its lower end. The thrust support 340 must be capable of translational movement, as well as angular adjustment to match the adjustments of its corresponding saw 80. Hence its shank is made to extend through a slot 341 in the table 60 parallel to the spline 112 which guides the base plate 110, and it is keyed to a bracket 342 by a key 344 so that it can be locked to the table by setting up a nut 345. The bracket 342 has an upstanding portion 346, the upper part of which is reduced and passes through the slot 107 and through an upright boss 347 on the plate 94, this upper part being the bolt 105. A nut 348 is set up on this bolt to clamp the plate 94 to the lower plate 110 and also to clamp the support 340 in adjusted angular position.

Figure 6:
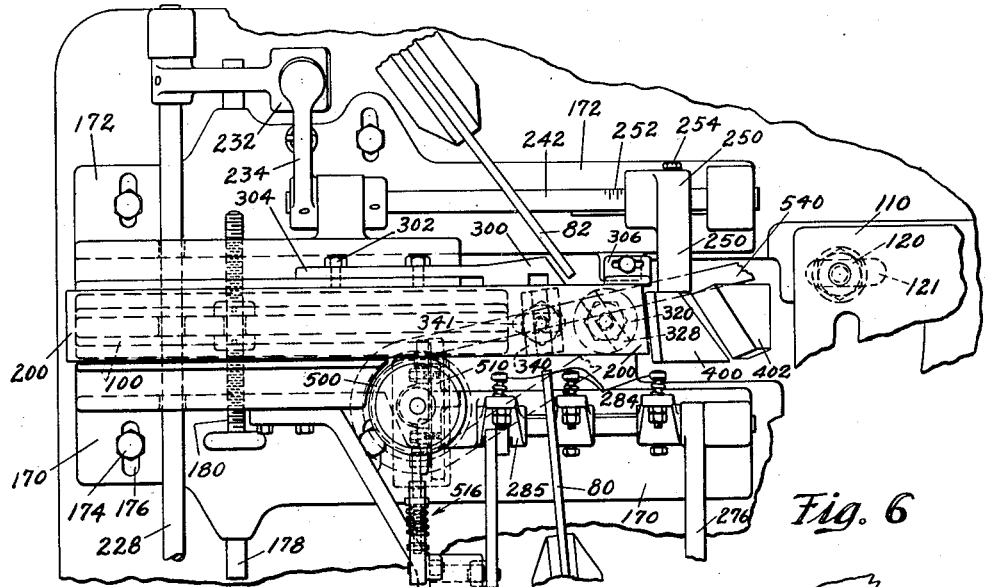
Figure 6 is a fragmentary plan view of a portion of the apparatus illustrated in Figure 1, with a strip-feeding means added.
Figure 7:
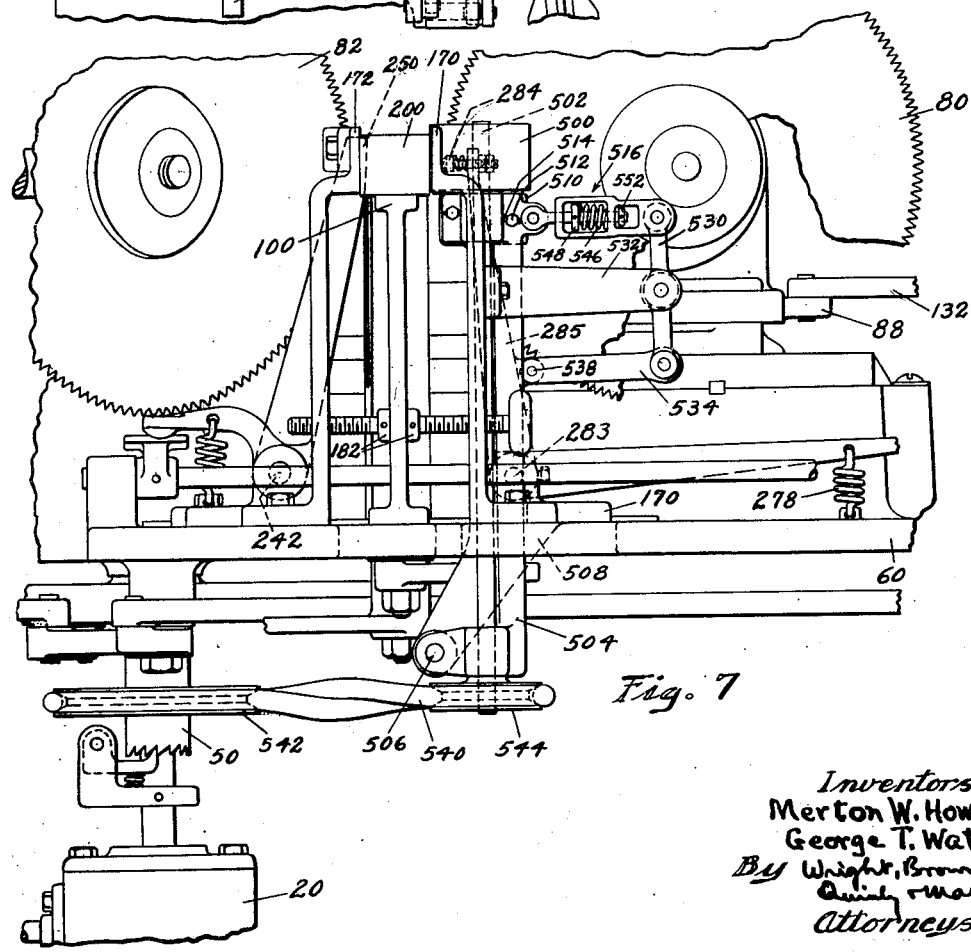
Figure 7 is a fragmentary front elevation of the same.

Means may be provided for feeding the strip 200 forward by power between successive cutting operations, but it is evident that such feeding may be done manually if preferred. Figures 6 and 7 are partial plan and side views of a power-driven feeding device mounted on one of the strip guide side supports and driven by connection with a pulley which is attached to the vertical cam shaft 50. As shown, the device comprises a rubber covered roll 500 mounted on a vertical shaft 502 which is journaled in a yoke 504 pivoted by a pin 506 to a bracket 508. This bracket projects down from side support 170 through a cored hole in table 60. The yoke 504 is held at its upper end in slidable relation to another bracket 510 on the support 170 by shoulder screws 152 in slots 514. This construction allows the rubber covered roll 500 to be moved into and out of feeding contact with a strip 200 in the strip guide. Such motion is imparted to the roll by a cushioned link 516, a lever 530 rockably supported by a bracket 532 on the side support 170, and a link 534 connected to one of the strip lock arms 285 by a pin 538. By hanging this entire mechanism on the side support 170, adjustment of said support for strip width has no effect on the action of the feeding device.

The feed roll 500 is driven at a constant speed by a crossed belt 540 connecting a pulley 544 on the roll shaft 502 and a larger pulley 542 on the cam shaft 50. Adjustment of guide slide support 170 will slightly change the distance between the centers of pulleys 542 and 544 but the effect is so slight that with a round belt and V pulleys no provision for taking care of this effect is required. A simple spring tensioned idler pulley would serve perfectly if compensation were required.

The cushioned link 516 is of conventional construction. A compression spring 546 is preloaded between a collar 548 pinned to one member of the two-piece link and an abutment on the other member. A collar 552 beyond said abutment acts to preload the spring 546. The relative strengths of the springs 546 and 278 are such that the compression spring 546 compensates for variations of strip width, wear of rubber tire, etc., and spring 278 is made strong enough to perform all of its before-mentioned functions plus the actuation of rubber roll 500 into and out of feeding relation to the strip 200.

In operation the operator has only to push each strip along the guide until the rubber feeding roll 500 can engage it, after which the strip will be automatically fed along against the stop 250 after each pair of blocks are sawed off until it runs off the feeding roll after which it is fed by the succeeding strip similarly started in by the operator. Figures 6 and 7 show the strip 200 being fed along the guide toward the strip stop 250 which has just been moved into the strip path in time to stop the strip but not to interfere with the ejection of the cut-off blanks 400 and 402.

Immediately after the strip 200 reaches the stop 250, the strip locking fingers 284 move into contact with the strip to lock it while the saws cut off another pair of blanks. This movement of the locking fingers acts through the lever 530 to withdraw the roll 500 from contact with the work. Retraction of the fingers results in re-engagement of the roll 500 with the work.

With the machine in full operation, the two saws 80 and 82 move toward and away from each other, as controlled by the cam 64, in periodic repetition. The strip stop 250 and the strip locking fingers 284 are actuated in timed relation to the saw movements. The locking fingers are moved to lock or grip the strip prior to the beginning of the cutting stroke of the saws, and they continue to hold the strip and severed blocks until the two saws are fully withdrawn from the path of the strip. Shortly after the retraction of the fingers 284 and the consequent movement of the feed roll 500 into operative position, the strip stop 250 is quickly moved into the path of the strip, where it remains until the fingers again clamp the strip and the feed roll is withdrawn from the strip, after which the stop is withdrawn.

In operation, strips are fed in succession along the strip guide channel composed of the bottom support 100 (Figure 2) and the two side supports 170 and 172 which are adjusted to fit the strip loosely with perhaps $\frac{1}{32}$ inch to $\frac{1}{16}$ inch clearance. As hereinbefore mentioned, such strips are usually made with two opposite side faces planed smooth in accurately spaced, parallel planes. Each strip is inserted in the guide channel with these finished faces presented to the vertical side faces of the guiding members so that only a slight clearance is required to insure that all of the strips for a given order of heels will be freely slidable in the channel and yet have little side play therein.

The first cut is made by saw 80 on the end of the strip to cut off the rough sawed end 404 (Figure 5) and to form the breast cut on the leading blank 402, after which the strip is moved either manually or by the feed roll 500 against the stop 250 as soon as it is released by the lock 284. This is repeated until the strip is all cut up into heel blanks. The strips are pushed into the machine one after the other, the following strip being used to push the short end of the preceding strip to the saws. If, in the interests of lumber economy, it is judged best to make on all strips the first trimming cut above described, the machine may be instantly stopped by pressure on treadle 32 so that time may be taken to see that the minimum amount of lumber is cut off in the end piece 404. The cut blanks drop through an aperture 410 in table 60 into a container below.

The setting-up adjustments are simple and nearly all the corresponding scale readings can be recorded on a card system to facilitate rapid setting up of the machine to saw blanks for any given size and style of heel. As to the strip guide, no adjustment is required for changes in heel-seat width, which is equivalent to the heightwise dimension of the strip 200 as seen in Figure 2. The height of the heel blank, equivalent to the widthwise dimension of the strip as seen in Figure 2, is adjusted for by loosening the four bolts 174 and turning the right- and left-hand screw 180 as required. This keeps the strip always central, relative to the two saws, regardless of strip dimension. The saw 82 always passes through the center of the strip guide at the same point. Its principal adjustment is an angular one as required to produce the desired back cut on the heel blanks. Also its cutting stroke length may be varied as required to cut barely through any particular strip, by adjusting the pivot block 142 along lever 144 to vary its radius and therefore its range of oscillation. The length of saw driving link 132 may be varied to compensate for the reduction in saw diameter for wear and to position the range of reciprocatory movement of the saw to best advantage, relative to the strip. The reason for providing for a saw movement only sufficient to cut through the strip is to thus be able to devote the largest possible percentage of the total time required for one cycle to the actual cutting off of the blank. By this procedure, the slowest possible cutting speed, and consequently the best cut for any given speed of production, is obtained.

The saw 80 is provided with the same angular adjustment as the saw 82, and in addition it has another adjustment lengthwise of the strip guide. By loosening the bolts 120 and nut 345 (Figure 1), the base plate 110 may be adjusted to vary the distance between the two saws as they cut through the strip. In this manner the length of the blank 400 (Figure 5) may be varied as required, while the length of the other blank 402 (Figure 5) may be similarly varied by the setting of strip stop 250 along the shaft 242 on the key 243. The bolt 254 locks the stop on the shaft, and similar scales 252 and 116 allow for records of these two blank length settings, respectively. Scales 106 provide for records of the front and back angles to cut on the blanks.

In order to keep at a minimum the number of adjustments necessary to adapt the machine to saw blanks for a different size or style of heel, the strip stop 250 and the clamping fingers 284 are carried respectively by the guide members 172 and 170, so that, when the guide members are adjusted to accommodate a strip of different width (corresponding to a different height of heel), the strip stop and clamping fingers shift with the guide members. The ball-and-paddle connections between the lever arms 232 and 234 in the case of the strip stop, and between the lever arms 274 and 276 in the case of the clamping fingers, permit such adjustive movements of the stop and fingers without change in their operating strokes since the movement of each ball by its paddle is independent of the particular point of the plane face of the plane which may be engaged by the ball, these plane faces being parallel to the respective shaft axes about which they rock.

Another feature which minimizes the number of necessary adjustments is the means which are provided for keeping the cutting thrust supports 320 and 340 (Figures 3 and 4) in a constant relation to their respective saws regardless of the adjustments of said saws either angularly, or, in the case of saw 80, lengthwise along the strip guide, as hereinbefore described.

It is evident that various modifications and changes may be made in the embodiment of the invention herein shown and described, without departing from the spirit or scope thereof as defined in the following claims.

We claim:

1. In a block sawing machine, in combination, a fixed strip guide including a finished surface engageable by a side of a strip and adapted to guide the strip for lengthwise feeding movement, a strip stop, means for moving said stop into and out of the path of the strip to limit and gage its forward movement, means cooperating with said surface to grip a strip, means for moving said cooperating means to and from strip-engaging position, a pair of power-driven circular saws disposed one each side of said strip guide, sliding supports for said saws, ways for said supports, means for angularly adjusting both said ways relatively to said strip guide and for adjusting one of said ways to vary the distance of its saw from said stop, and means for simultaneously moving the two supports along their respective ways.

2. A block sawing machine comprising a horizontal work support for a strip of wood to be cut, said work support having a stationary portion and a separate portion angularly adjustable about a vertical axis and with a slot therein to receive a saw blade, a circular saw mounted with its blade in a vertical plane and movable through a cutting stroke in its plane, means for angularly adjusting said saw, and means mechanically connecting said saw and the adjustable portion of the work support in such a manner as to maintain said slot alined with said saw blade for any position of adjustment of the saw.

3. A block sawing machine comprising an elongated horizontal support for a strip of wood to be cut, said work support having a stationary portion and a separate portion adjustable angularly about a vertical axis and movable toward and from the stationary portion, a circular saw horizontally movable in its own plane through a cutting stroke toward said adjustable portion of the work support and mounted for angular adjustment and for horizontal linear adjustment in a direction parallel to the long axis of said support, said adjustable portion of the work support having a slot therein to receive said saw, and means mechanically connecting said saw and said adjustable portion of the work support so that said slot is always alined with said saw for any position of adjustment of the saw.

4. A machine for sawing blocks from a strip of wood, comprising a horizontal guide and support for the work, a stop element engageable by the end of a strip to be cut, a pair of saws movable to make simultaneous cuts through the work from opposite sides, means for adjusting the angular relation of the saws to said guide, and means for adjusting the spacing between said saws and the stop element.

5. A machine for sawing wood heel blanks two at a time from a strip of wood, comprising a horizontal guide and support for the strip, a stop element engageable by the end of the strip to be cut, a pair of saws arranged at different oblique angles relative to the axis of the strip and movable to make simultaneous cuts through the strip from opposite sides thereof, means for adjusting the angular relation of each said saw to said guide, and means for adjusting the spacing between said saws and the stop element.

MERTON W. HOWARD.
GEORGE T. WATT.